United States Patent
Khawaja

(10) Patent No.: US 10,632,346 B2
(45) Date of Patent: Apr. 28, 2020

(54) SPORTS BALL AND METHOD OF MANUFACTURING SPORTS BALL

(71) Applicant: Anwar Khawaja Industries (Pvt) Limited, Punjab (PK)

(72) Inventor: Omer Khawar Khawaja, Punjab (PK)

(73) Assignee: ANWAR KHAWAJA INDUSTRIES PVT. LTD., Punjab (PK)

( * ) Notice: Subject to any disclaimer, the term of this patent is extended or adjusted under 35 U.S.C. 154(b) by 0 days.

(21) Appl. No.: 15/917,957

(22) Filed: Mar. 12, 2018

(65) Prior Publication Data
US 2019/0105540 A1    Apr. 11, 2019

(30) Foreign Application Priority Data
Oct. 5, 2017   (PK) .................................... 513/2017

(51) Int. Cl.
| A63B 41/08 | (2006.01) |
| A63B 45/00 | (2006.01) |
| B32B 7/12  | (2006.01) |
| B32B 5/18  | (2006.01) |

(52) U.S. Cl.
CPC .............. *A63B 41/08* (2013.01); *A63B 45/00* (2013.01); *B32B 5/18* (2013.01); *B32B 7/12* (2013.01)

(58) Field of Classification Search
CPC .......... A63B 41/02; A63B 41/08; A63B 41/10
USPC ......................................... 473/599, 603–608
See application file for complete search history.

(56) References Cited

U.S. PATENT DOCUMENTS

| 2,295,804 | A  | * | 9/1942  | Olson      | F16K 15/202 |
|           |    |   |         |            | 137/223     |
| 6,503,162 | B1 | * | 1/2003  | Shishido   | A63B 41/08  |
|           |    |   |         |            | 473/599     |
| 6,544,608 | B1 | * | 4/2003  | Jain       | A63B 41/02  |
|           |    |   |         |            | 264/305     |
| 6,793,597 | B2 | * | 9/2004  | Awan       | A63B 41/02  |
|           |    |   |         |            | 473/594     |
| 7,749,116 | B2 | * | 7/2010  | Tang       | A63B 41/08  |
|           |    |   |         |            | 473/598     |
| 8,672,783 | B2 | * | 3/2014  | Fujikura   | A63B 41/08  |
|           |    |   |         |            | 473/604     |
| 9,011,621 | B1 | * | 4/2015  | Hussain    | B32B 7/12   |
|           |    |   |         |            | 156/147     |
| 9,844,705 | B2 | * | 12/2017 | Ahsan      | A63B 45/00  |
| 9,884,227 | B2 | * | 2/2018  | Berggren   | A63B 45/00  |
| 9,919,189 | B1 | * | 3/2018  | Ahmed      | A63B 41/08  |
| 2017/0304685 | A1 | * | 10/2017 | Iqbal    | A63B 39/02  |

FOREIGN PATENT DOCUMENTS

DE     102007012451 A1 *  9/2008  ............ A63B 41/02
JP        2009254636 A   * 11/2009

* cited by examiner

*Primary Examiner* — Laura Davison
(74) *Attorney, Agent, or Firm* — Troutman Sanders LLP; Ryan A. Schneider; Micah Hensley

(57) ABSTRACT

A sports ball including a plurality of specifically-configured panels bonded together along their abutting edges, and bonded with a carcass on the inner surface of the panels by an adhesive. The carcass surrounds the entire surface of a hanging or suspended elastic bladder that is not fixedly attached to the carcass. The panels include a casing that forms an exterior surface of the ball, and at least one lining layer to give structure, strength and softness to the ball.

29 Claims, 15 Drawing Sheets

SPORTS BALL AND METHOD OF MANUFACTURING SPORTS BALL

CROSS-REFERENCE TO RELATED APPLICATIONS

This application claims the benefit of Pakistani Application No. 513/2017 filed 5 Oct. 2017 the entire contents and substance of which is hereby incorporated by reference.

BACKGROUND OF THE INVENTION

1. Field of the Invention

The present invention relates to a ball, materials utilized in its construction, its arrangements, and a method of manufacturing thereof. More specifically, the present invention relates to a sports ball like a soccer ball, basketball, American football or rugby ball, futsal ball or other similar game ball.

2. Description of Related Art

Conventionally, there are two types of inflatable sports ball available. Each type mainly comprises an elastic bladder, a restriction layer bonded with the bladder, and casing material with or without lining layers. The differences between the two types resides in the differences between having a lining layer-a stitched (machine or hand) ball, or not having such a layer-a laminated or thermo-bonded ball. A variety of techniques and methods have been utilized to manufacture such sports balls that would have the qualities of a match or professional ball.

A conventional stitched ball has many drawbacks related to cost, time and quality (e.g. durability) of the ball. The hand-stitched ball is comparatively expensive and requires a highly-skilled labor force and prolonged manufacturing processes, and thus it is not cost efficient today, and costs are only constantly increasing every year.

A machine stitched ball is cheaper in construction than a hand-stitched ball, requires a shorter process of manufacturing and is more cost effective. Both types of stitched balls still have many disadvantages, including loose or exposed stitching, high water uptake, poor performance of the ball and hardness at the seams due to use of thread for stitching. Another disadvantage lies in the fact that once a single stitch is broken, likely the entire chain of stitches opens or loosens.

Currently, sports balls, particularly soccer balls, are also under a lot of criticism due to the rising rate of concussions due to hardness of the ball, particularly in youth and women players. In the conventional sports ball, such hardness is mainly caused due to the presence of stitching at the seams or abutting edges, and the use of a bonded bladder, the bonding of restriction layer and bladder surface, decreases the softness or elasticity of the bladder and makes it harder such that concussion during head strike of the ball are not uncommon.

Many sports ball manufacturers use outdated bladder technology for machine stitched, hybrid, and thermos-bonded balls in which the bladder is wound with thread using an adhesive, resulting in a so-called "thread-wound bladder". This combination of thread and bladder become essentially unify into a single unit due to the use of adhesive. Once the bladder is deflated or inflated, the thread deflates or inflates with the bladder shell as they have become one construction. This results in the outer shell of the bladder being very hard in an inflated condition.

Another method of construction uses patches of fabric that are attached directly onto the bladder shell via adhesive. Once attached, the bladder shell and fabric patches similarly become a unified construction of bladder/patches resulting in a very hard bladder. When a pasted fabric bladder is deflated or inflated, the fabric deflates or inflates along with the shell. This method similarly results in a hard-shell bladder since fabric, adhesive and bladder shell act as one unit.

The thermo-bonding manufacturing method is comparatively fast, and due to the absence of stitching, the ball is relatively soft at the abutting edges. But there is still a need to soften the ball from edges and the bladder shell to help decrease the rate of concussions caused during head strike.

U.S. Pat. No. 7,749,116, which is incorporated herein by reference, discloses a method of manufacturing a ball using a thermo-bonding technique in which panels of a ball—comprised of casing and a thickness adjusting member (i.e. foam)—are bonded together through adhesive. The peripheral edges or flange areas of the panel are turned inside by cutting the panel from the vertices and bonding adjacent panels through abutting edges under heat and pressure. It includes one of the fastest methods to form panels to manufacture a thermo-bonded ball.

U.S. Pat. No. 6,685,585, which is incorporated herein by reference, discloses a skiving method where edges of a leather panel or casing are skived at a certain degree and then joined together. As disclosed, thickness adjusting member foam, fabric or a combination thereof is smaller than the leather panel or casing and peripheral edges of the leather panel are turned inside without applying heat, resulting in formation of soft edges as compared to the aforementioned method. However, the skiving method is very slow and costly. This is a very slow process and the placement of foam in the center to leave an equal portion of the casing for turning is very difficult and usually not practically observed with a high rate of accuracy.

A disadvantage of these methods includes that once the bladder is inflated, the fabric or thread-wound bladder shell directly touches the seams/T-junction of the outer shell. Of course, once the bladder directly touches at the seams, then the seams become hard, and use of such a ball can result in concussions. Thus, a need has arisen in the art to soften the panels from the abutting edges and/or to reduce the stress on the seams/T-junction.

A disadvantage of these methods includes that the ball has a very low groove at its seams, resulting in the loss of defined trajectory, as well as instability of ball in the air. Low groove seams create less drag, which gives players unpredictable results after kicking.

The football manufacturers have also been facing another problem related to a high rate of air loss or air leakage from an inflated ball. The rate of air leakage is generally observed to be from ten to fifteen percent (10%-15%) within seventy-two hours (72 hrs.) of full inflation, which also affects the durability of the ball. Due to such a property of the elastic/rubber bladder, there is a need to re-inflate the ball using an inflation tool in a repeated manner.

Thus, a need has arisen in the art to find innovative techniques related to the composition, configuration, and/or position of construction materials within the panels of a ball. Further, what is needed is an inventive method of manufacturing such a ball, to resolve, minimize and/or eliminate the problems found in conventional manufacturing. It is an intention of the present invention to provide such innovations in ball manufacturing technology and ball construction.

BRIEF SUMMARY OF THE INVENTION

Briefly described, in an exemplary form, the present invention comprises a sports ball comprising a plurality of panels bonded to one another along edges of the panels, wherein a panel is comprised of a casing (layer) disposed to form an exterior surface of the ball, the casing being bonded on its inner surface to a first lining layer by an adhesive, a hanging or suspended bladder surrounded by a carcass, wherein the bladder is not attached to the carcass, and wherein the carcass is attached or bonded to an inner surface of the panels by an adhesive.

The casing can comprise artificial leather, polyvinyl chloride (PVC), polyurethane (PU) or thermoplastic polyurethane (TPU).

The first lining layer can comprise foam, and the foam can be formed of a material selected from the group consisting of chloroprene (CR), polyurethane (PU), ethylene vinyl acetate (EVA), polyethylene (PE), polyvinyl chloride (PVC), polystyrene, polyolefin, ethylene propylene diene monomer (EPDM), polyolefin elastomer (POE), thermoplastic elastomer (TPE), natural foam, artificial foam, and hybrid foam.

The bladder can be selected from the group consisting of a zero wing bladder, four wings bladder, seven wings bladder, or multiple wings bladder, and the bladder can comprise a material selected from the group consisting of a natural monomer, synthetic monomer, and polymer.

The carcass can comprise a plurality of fabric panels overlapping one another and laminated together.

The sports ball can be a soccer ball, football, volleyball, basketball, playground ball, futsal ball, or handball.

The bladder can further comprise a valve that extends outwardly from the bladder through a valve panel, and the valve panel can have a pentagonal shape. The valve can comprise a valve housing, a valve heart, and a circular fabric patch laminated to a collar of the valve housing.

The sports ball can further comprise parallel grooves formed at a flange or a peripheral area of the first lining layer, wherein a length of each groove can be from approximately 15-25 mm, and a width of each groove can be equal to at least one of (i) a distance between two adjacent grooves, and (ii) from approximately 1.0-3.0 mm.

The sports ball can further comprise a barrier coating of anti-adhesive chemical applied to an outer surface of the bladder and/or to an inner surface of the carcass to limit or prevent the bladder and the carcass from sticking or bonding together.

The sports ball can further comprise a thin layer of a monomer or polymer applied to an outer surface of the bladder, wherein the thin layer of the monomer or polymer reduces escape of pressurized air outwardly from an interior of the bladder.

The casing and the first lining layer can have a similar shape, and the casing can be greater in size than the first lining layer, such that a peripheral area of the casing is formed around an edge of the first lining layer with less than approximately 6.5 mm between the edge of the first lining layer and an edge of the casing.

The first lining layer can be further bonded to a second lining layer disposed on a side of the first lining layer opposite to the casing.

The first lining layer can comprise a plurality of perforations forming a perforated line at a position from approximately 2-4 mm from the edge of the first lining layer.

The second lining layer can comprise a plurality of perforations forming a perforated line at a position from approximately 2-4 mm from an edge of the second lining layer, and can further comprise a plurality of holes, each one of the plurality of holes being formed in the second lining layer at a position from approximately 15-25 mm from a respective vertex or corner of the second lining layer.

A horizontal length of each one of the perforations of the first lining layer and of the second lining layer can be from approximately 1.8-2.5 mm, a distance between two adjacent perforations in their axial direction can be from approximately 1.5-2.2 mm, the holes can be formed in a circular shape, and the holes can each have a diameter of from approximately 1.5-3.5 mm.

The second lining layer can have a shape similar to a shape of the first lining layer, and the second lining layer can have a size that is between a maximum size that is the same size as the first lining layer, and a minimum size selected so that a peripheral area of the first lining layer is formed around the second lining layer with less than from approximately 0.3-9.5 mm between the edge of the first lining layer and an edge of the second lining layer.

The peripheral area of the casing can be turned inwardly toward the edge of the first lining layer and the edge of the second lining layer, and an air cavity can be formed between the casing and the adjacent edge of the second lining layer due to differences in sizes of the first lining layer and second lining layer.

A thickness of the casing can be from approximately 0.5-2.0 mm, a thickness of the first lining layer can be from approximately 1.5-6.5 mm, a thickness of the second lining layer can be from approximately 0.5-2.5 mm, and a collective thickness of the panel can be such that it is not more than approximately 8.5 mm.

The first lining layer and the casing can be similar in shape and size, and the casing and the first lining layer can have a notch formed at each vertex or corner of the panel.

A cut can be made in the first lining layer at a position from approximately 2.0-4.0 mm from the edge of the first lining layer to form flanges around the edge of the first lining layer, wherein the flanges can be disposed to be turned inwardly and be bonded by adhesive to abutting edges of the first lining layer. A thickness of the casing in this exemplary embodiment can be from approximately 0.5-2.0 mm, a thickness of the first lining layer can be from approximately 1.5-6.5 mm, and a collective thickness of the panel can be such that it is not more than approximately 8.5 mm.

In another exemplary form, the present invention comprises a method of manufacturing a sports ball comprising forming a plurality of panels, wherein each panel is formed by cutting from a first sheet material a casing, cutting from a second sheet material a first lining layer having a same shape as the casing and a smaller size than the casing, cutting from a third sheet material a second lining layer having a same shape as the first lining layer and an equal or smaller size to the first lining layer, attaching the casing to the first lining layer, the first lining layer is further attaching to the second lining layer, applying adhesive to a peripheral area of the casing and turning peripheral edges of the casing inwardly toward edges of the first and second lining layer, and attaching the peripheral edges of the casing to respective abutting edges of the first lining layer, then attaching the panels to one another along edges of the panels to form an outer shell of the ball, forming a carcass that surrounds a bladder that is suspended or hangs within the carcass, wherein the bladder is not attached to the carcass, attaching an outer surface of the carcass to an inner surface of the panels, and molding the outer shell of the formed sport ball.

The method can further comprise forming a notch at each corner of the casing.

The method can further comprise forming perforated lines in the first lining layer and the second lining layer.

The method can further comprise forming a circular hole at each vertex or corner of the second lining layer.

In another exemplary form, the present invention comprises a method of manufacturing a sports ball comprising forming a plurality of panels, wherein each panel is formed by cutting from a sheet material that is made by bonding the casing sheet and lining sheet through an adhesive, forming parallel grooves in peripheral edges of the first lining layer, forming cutting lines in peripheral edges of the first lining layer perpendicular to the parallel grooves to form a flange at each side of the panel, and turning of the flanges inwardly and attaching to respective edges of the first lining layer, then attaching the panels to one another along edges of the panels to form an outer shell of the ball, forming a carcass that surrounds a bladder that is suspended or hangs within the carcass, wherein the bladder is not attached to the carcass, attaching an outer surface of the carcass to an inner surface of the first lining layer of the panels, and molding the outer shell of the formed sport ball.

The method can further comprise forming a notch at each corner or vortex of the casing and first lining layer (or the panel).

The method can further comprise coating the bladder with a monomer or polymer coating that resists escape of air from an interior of the bladder.

The method can further comprise coating the inner surface of the carcass or outer surface of the bladder with an anti-adhesive chemical to prevent bonding of the carcass and the bladder.

One object of the present invention is to provide a soft sports ball with excellent performance, namely in feel, stability, durability, playability, flight and other aerodynamic characteristics of the match or professional ball.

Another object of the present invention is to reduce if not remove the rate of concussion caused by the hardness known with the conventional ball's panels, particularly at their edges or seams, by utilizing an innovative composition and structure, configuration and positions of the materials (casing lining layer) within the panels.

Another object of the present invention is to reduce the hardness known with the conventional ball originating due to the use of a bonded bladder e.g. fabric wrapped and thread-wound bladder, by introducing a hanging bladder and/or its distinctive arrangement of the bladder and carcass within the ball.

Another object of the present invention is to provide a solution to reduce the conventional air leakage from the inflated bladder of the finished ball by introducing a valve having a double lock mechanism/system into the bladder and/or coating of a monomer/polymer on the outer surface of the bladder.

Another object of the present invention is to provide a unique method of manufacturing a good quality sports ball that reduces the time of manufacturing relative to the time conventionally required.

These and other objects, features and advantages of the present invention will become more apparent upon reading the following specification in conjunction with the accompanying drawing figures.

DETAIL DESCRIPTION OF THE INVENTION

Figure 1A:
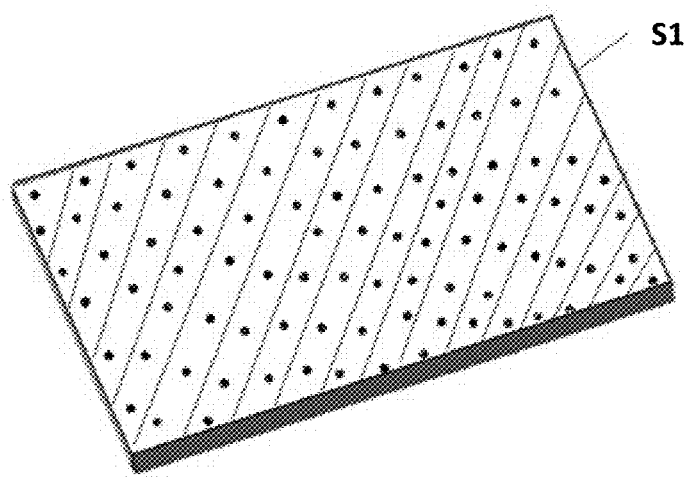
FIGS. 1A-1C illustrates specific/average-sized sheets of the casing or top layer, first lining layer and second lining layer of the present invention, according to an exemplary embodiment.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It also should be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one value and/or to "about" or "approximately" or "substantially" another value. When such a range is expressed, other exemplary embodiments include from the one value and/or to the other value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

In preferred embodiments, discussions and accompanying figures disclose various construction materials, their unique arrangement and method relating to the manufacture of panels and the sports ball.

For demonstration and simplicity, a thirty-two-panel sports ball is depicted to show the innovative specifications, materials, their arrangements, techniques, and manufacturing processes of the present invention, but those of skill in the art will understand that similar specifications and technologies also can be applied to various other types of inflatable sports balls having different purposes and configurations.

For example, the present invention can comprise an inflatable ball having various numbers of panels, including from two, three, four, six, eight, 10, 12, 14, 20, 21, 24 and 32 panels, and include a variety of ball types, for example, a soccer ball, football, basketball or handball, volleyball, futsal ball, and others.

In the present invention, an exemplary football comprises 32 panels (i.e. 20 hexagons and 12 pentagons) to form a sports ball.

In an exemplary embodiment, as shown in the figures, the present invention is a sports ball comprising an inflatable bladder, a carcass, and a plurality of panels communicative with one another along edges of the panels, wherein the inflatable bladder is located within the carcass, wherein each panel comprises at least two layers, a casing layer having an outer surface and an inner surface, and a first lining layer having an outer surface and an inner surface, wherein the outer surface of the casing layer forms an exterior surface of the sports ball, wherein the inner surface of the casing layer is communicative with the outer surface of the first lining layer, and wherein the inner surface of the first lining layer is communicative with an outer surface of the carcass.

The inflatable bladder preferably is not fixedly attached to the carcass.

The plurality of panels is communicative with one another along edges of the panels via bonding of the edges.

The inner surface of the casing layer is communicative with the outer surface of the first lining layer via an adhesive.

The inner surface of the first lining layer is communicative with the outer surface of the carcass via an adhesive.

The inflatable bladder comprises a hanging or suspended inflatable bladder surrounded by the carcass.

Each panel comprises the first lining layer and the casing can be similar in shape and size, and the casing and the first lining layer can have a notch formed at each vertex or corner of the panel.

A cut can be made in the first lining layer at a position from approximately 2.0-4.0 mm from the edge of the first lining layer to form flanges around the edge of the first lining layer, wherein the flanges can be disposed to be turned inwardly and be bonded by adhesive to abutting edges of the first lining layer. A thickness of the casing in this exemplary embodiment can be from approximately 0.5-2.0 mm, a thickness of the first lining layer can be from approximately 1.5-6.5 mm, and a collective thickness of the panel can be such that it is not more than approximately 8.5 mm.

The sports ball further comprises a barrier coating of an anti-adhesive chemical applied to one or both of an outer surface of the inflatable bladder and/or an inner surface of the carcass to limit fixable attachment of the inflatable bladder to the carcass.

The sports ball further comprises a low permeate layer applied to an outer surface of the inflatable bladder, wherein the inflatable bladder has a first permeability, wherein the combination of the inflatable bladder with the low permeate layer has a second permeability, and wherein the second permeability is lower than the first permeability.

In another exemplary embodiment, as shown in the figures, the present invention is a sports ball comprising a hanging or suspended inflatable bladder, a carcass surrounding the hanging or suspended inflatable bladder, wherein the inflatable bladder is not fixedly attached to the carcass, and a plurality of panels bonded to one another along edges of the panels, wherein each panel comprises a casing layer having an outer surface and an inner surface, a first lining layer having an outer surface and an inner surface, and a second lining layer having an outer surface and an inner surface, wherein the outer surface of the casing layer forms an exterior surface of the sports ball, wherein adhesive bonds at least a portion of the inner surface of the casing layer with at least a portion of the outer surface of the first lining layer, wherein adhesive bonds at least a portion of the inner surface of the first lining layer with at least a portion of the outer surface of the second lining layer, and wherein adhesive bonds at least a portion of the inner surface of the second lining layer with at least a portion of the outer surface of the carcass.

At least one panel comprises a casing layer of greater surface area than the first lining layer, and the overall shape of the casing layer and the first lining layer are similar such that when the first lining layer is co-located with the casing layer such that a center of each is aligned with one another, a width of a first peripheral area of the panel is defined by the generally uniform difference between the perimeter of the casing layer and the perimeter of the first lining layer.

The width of the first peripheral area is less than approximately 6.5 mm.

At least one panel comprises a first lining layer of greater surface area than the second lining layer, and the overall shape of the first lining layer and the second lining layer are similar such that when the second lining layer is co-located with the first lining layer such that a center of each is aligned with one another, a width of a second peripheral area of the panel is defined by the generally uniform difference between the perimeter of the first lining layer and the perimeter of the second lining layer.

The width of the second peripheral area is from approximately 0.3-9.5 mm.

The first lining layer comprises a plurality of perforations forming a perforated perimeter line at a position from approximately 2-4 mm from the perimeter edge of the first lining layer.

The second lining layer comprises a plurality of perforations forming a perforated perimeter line at a position from approximately 2-4 mm from the perimeter edge of the second lining layer, and the second lining layer comprises an aperture therethrough.

The shape of the second lining layer comprises a plurality of vertexes or corners, the second lining layer comprises a plurality apertures therethrough, and an aperture is positioned from approximately 15-25 mm from a respective vertex or corner.

The sports ball further comprises an air cavity between the casing layer and an adjacent edge of the second lining layer due to differences in sizes of the first lining layer and second lining layer.

The sports ball further comprises a barrier coating of an anti-adhesive chemical applied to one or both of an outer surface of the inflatable bladder and/or an inner surface of the carcass to limit fixable attachment of the inflatable bladder to the carcass.

The sports ball further comprises a low permeate layer applied to an outer surface of the inflatable bladder, wherein the inflatable bladder has a first permeability, wherein the combination of the inflatable bladder with the low permeate layer has a second permeability, and wherein the second permeability is lower than the first permeability.

In another exemplary embodiment, as shown in the figures, the present invention is a sports ball comprising a hanging or suspended inflatable bladder having a first permeability, a low permeate layer applied to an outer surface of the inflatable bladder, wherein the combination of the inflatable bladder with the low permeate layer has a second permeability, a carcass surrounding the hanging or suspended inflatable bladder, wherein the inflatable bladder is not fixedly attached to the carcass, a barrier coating of an anti-adhesive chemical applied to one or both of the low permeate layer and an inner surface of the carcass to limit fixable attachment of the inflatable bladder to the carcass, a plurality of panels bonded to one another along edges of the panels, wherein each panel comprises a casing layer having an outer surface and an inner surface, a first lining layer having an outer surface and an inner surface, and a second lining layer having an outer surface and an inner surface, wherein the overall shape of the casing layer, the first lining layer and the second lining layer are similar, the shape comprises a plurality of vertexes or corners, wherein the first lining layer comprises a plurality of perforations forming a perforated perimeter line at a position from approximately 2-4 mm from the perimeter edge of the first lining layer, wherein the second lining layer comprises a plurality of perforations forming a perforated perimeter line at a position from approximately 2-4 mm from the perimeter edge of the second lining layer, and a plurality apertures therethrough, and wherein an aperture is positioned from approximately 15-25 mm from a respective vertex or corner, wherein each panel comprises a casing layer of greater surface area than the first lining layer, and a first lining layer of greater surface area than the second lining layer, wherein when the first lining layer is co-located with the casing layer such that a center of each is aligned with one another, a width of a first peripheral area of the panel is defined by the generally uniform difference between the perimeter of the casing layer and the perimeter of the first lining layer, wherein when the second lining layer is co-located with the first lining layer such that a center of each is aligned with one another, a width of a second peripheral area of the panel is defined by the generally uniform difference between the perimeter of the first lining layer and the perimeter of the second lining layer, wherein the width of the first peripheral area is less than approximately 6.5 mm, wherein the width of the second peripheral area is from approximately 0.3-9.5 mm, wherein an air cavity is formed between the casing layer and an adjacent edge of the second lining layer due to differences in sizes of the first lining layer and second lining layer, wherein the outer surface of the casing layer forms an exterior surface of the sports ball, wherein adhesive bonds at least a portion of the inner surface of the casing layer with at least a portion of the outer surface of the first lining layer, wherein adhesive bonds at least a portion of the inner surface of the first lining layer with at least a portion of the outer surface of the second lining layer, wherein adhesive bonds at least a portion of the inner surface of the second lining layer with at least a portion of the outer surface of the carcass. The first peripheral area is turned inwardly toward the edge of the first lining layer and the edge of the second lining layer, and the air cavity is formed between the casing layer and the adjacent edge of the second lining layer due to differences in sizes of the first lining layer and second lining layer.

The thickness of the casing layer is from approximately 0.5-2.0 mm, the thickness of the first lining layer is from approximately 1.5-6.5 mm, and the thickness of the second lining layer is from approximately 0.5-2.5 mm.

The collective thickness of each panel is less than approximately 8.5 mm.

The casing layer and the first lining layer has a notch formed at each vertex or corner of the panel.

An outer flange area of the first lining layer comprises parallel grooves, wherein the length of each groove is from approximately 15-25 mm, and wherein the width of each groove is at least one of (i) a distance between two adjacent grooves and (ii) from approximately 1.0-3.0 mm.

At a position from approximately 2.0-4.0 mm from the edge of the first lining layer a cut is provided to form flanges around the edges of the first lining layer, wherein the flanges are disposed to be turned inwardly and bonded by adhesive to abutting edges of the first lining layer.

Figure 1B:
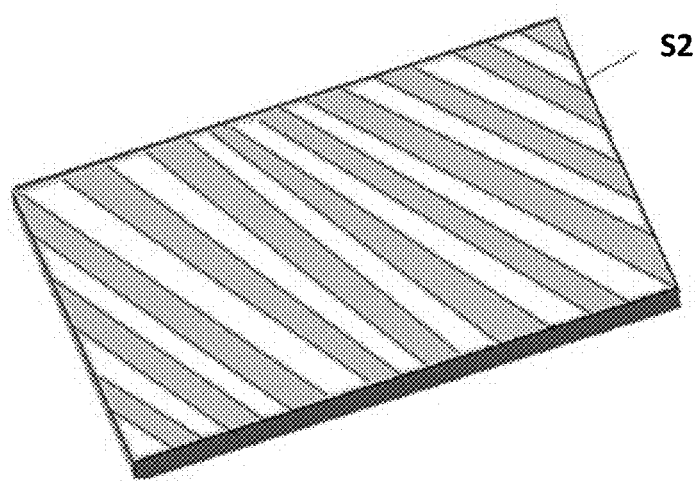
Figure 1C:
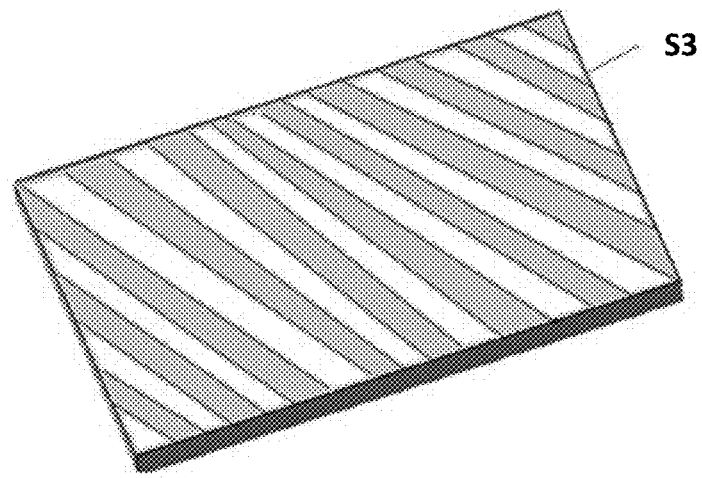

FIGS. 1A-1C illustrate exemplary average-sized casing (or top layer sheet) $S_1$, a first lining layer sheet $S_2$ and an additional (second) lining layer sheet $S_3$ that may be obtained from a larger sheet of materials.

Figure 2:
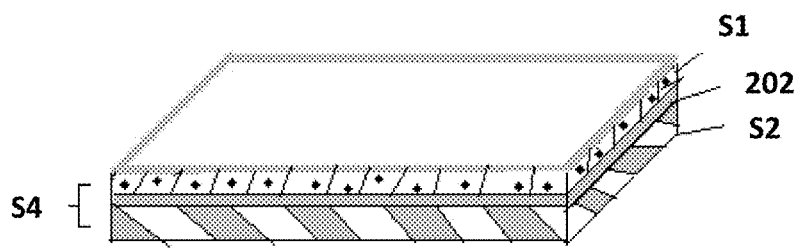
FIG. 2 illustrates specific-sized sheets wherein the casing and first lining layer sheets are bonded or laminated together according to an exemplary embodiment of the present invention.

FIG. 2 illustrates an exemplary average-sized composite sheet $S_4$ that is formed by bonding the casing sheet $S_1$ and first lining layer sheet $S_2$ via an adhesive 202. The application of an adhesive 202 can be achieved manually or by machine.

Figure 3A:
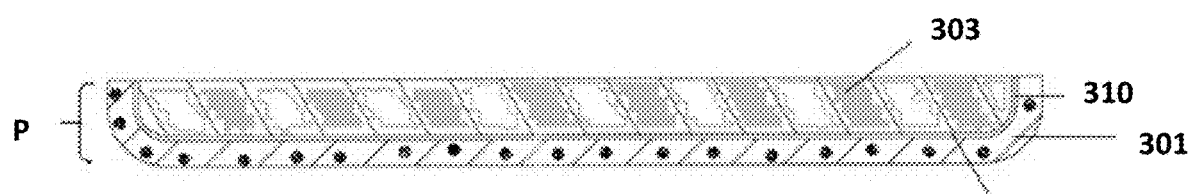
FIGS. 3A-3C illustrate an enlarged cross-sectional view of an exemplary panel comprising a casing, first lining layer and second lining layer of the present invention, according to an exemplary embodiment of the present invention.

FIG. 3A illustrates an enlarged cross-sectional view of an exemplary panel P, wherein a first lining layer 303 can have a similar shape, but be smaller in size as compared to the casing 301, and is bonded together to casing 301 by an adhesive 302. The peripheral area 310 of the casing 301 can correspond to a thickness of abutting edges of the lining layer 303, but not be more than approximately 6.5 mm, which may be turned inside and bonded with the abutting edges of the first lining layer 303.

Figure 3B:
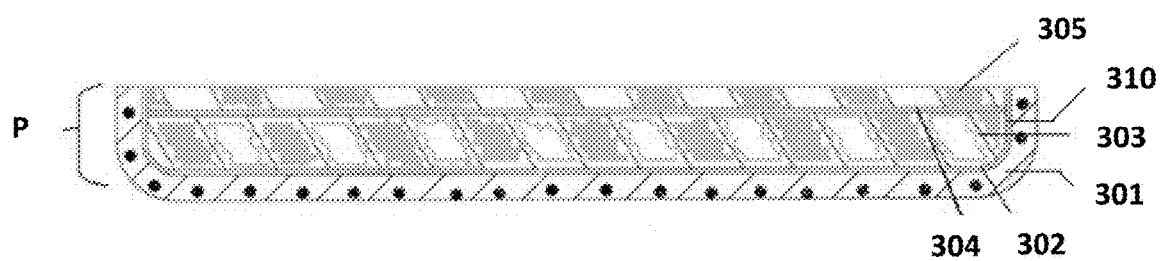

FIG. 3B illustrates a cross-sectional view of an exemplary panel P, wherein an additional (second) lining layer 305 can have similar shape and size of the first lining layer 303 and be further bonded to the first lining layer 303 by an adhesive 304. The peripheral area 310 of the casing 301 can correspond to the sum of the thickness of the abutting edges of the lining layer 303 and additional (second) lining layer 305, but not more than approximately 6.5 mm. The peripheral area 310 is turned inside and bonded with the abutting edges of the first and second lining layers 303 and 305.

Figure 3C:
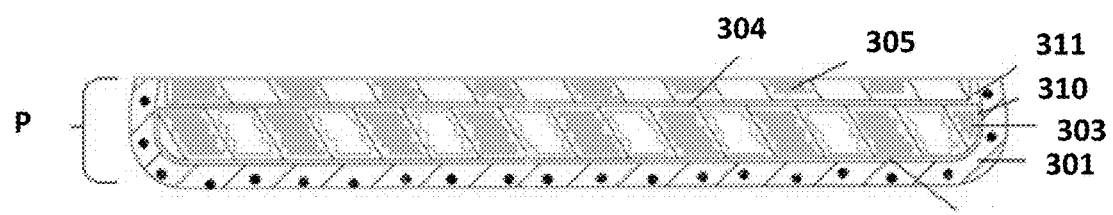

FIG. 3C illustrates the cross-sectional view of an exemplary panel P, wherein the additional (second) lining layer 305 can have similar shape, but smaller size (for example not more than from approximately 0.5-9.5 mm) from the first lining layer 303, and be further bonded to the first lining layer 303 by the adhesive 304. The peripheral area 310 of the casing 301 can corresponds to the sum of the thickness of the abutting edges of the first lining layer 303 and additional (second) lining layer 305, but not more than approximately 6.5 mm. The peripheral area 310 is turned inside and bonded with the abutting edges of first and second lining layers 303 and 305.

In the panel P of FIG. 3C, an air cavity 311 can be formed between casing 301 and abutting edges of additional (second) lining layer 305 due to size differences between the first and second lining layers. This air cavity 311 can provide excellent softness and groove formation at joints of an exemplary embodiment of the present invention. The air cavity 311 can further aid inside movement of the joints when the bladder exerts pressure in the middle of the exemplary panel P.

FIGS. 4A-4I illustrate a method of manufacturing an exemplary panel P depicted in FIGS. 3A to 3C.

In an exemplary panel P, casing 301, first lining layer 303 and an additional (second) lining layer 305 can obtained by cutting their respective average-sized sheets $S_1$, $S_2$ and $S_3$ into shapes depicted in FIGS. 4A-4B, 4C-4D and 4E-4F respectively.

Figure 4A:
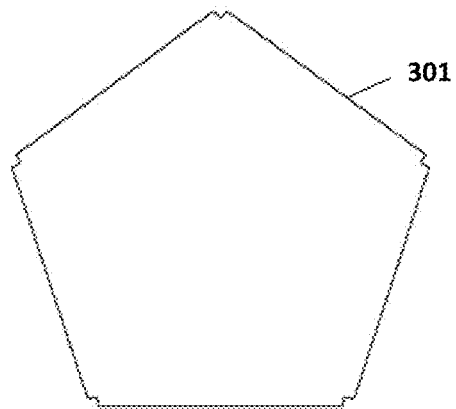
FIGS. 4A-4I illustrate a method of manufacturing an exemplary panel of the present invention, wherein the casing and first lining layer are not in equal in size and bonded or laminated together and further bonded to second lining layer, according to an exemplary embodiment of the present invention.
Figure 4B:
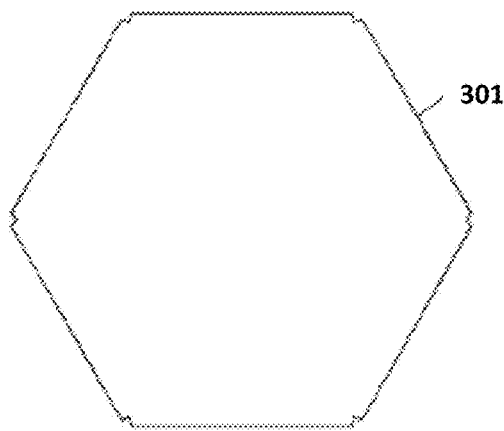
Figure 4C:
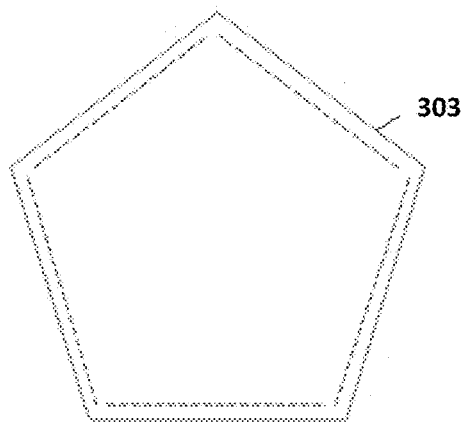
Figure 4D:
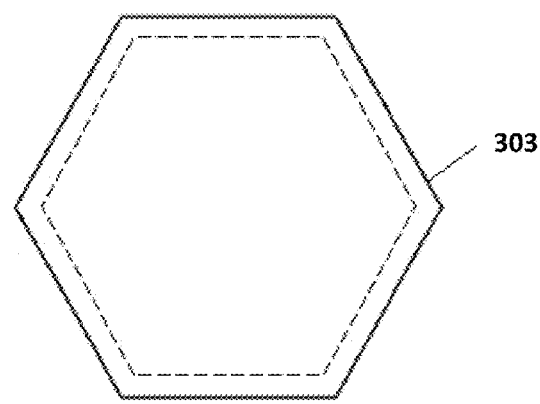
Figure 4E:
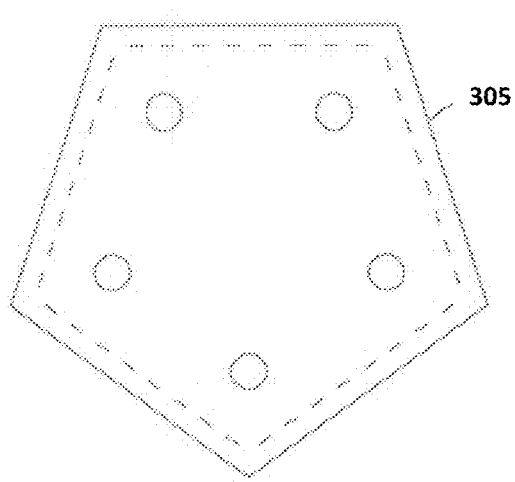
Figure 4F:
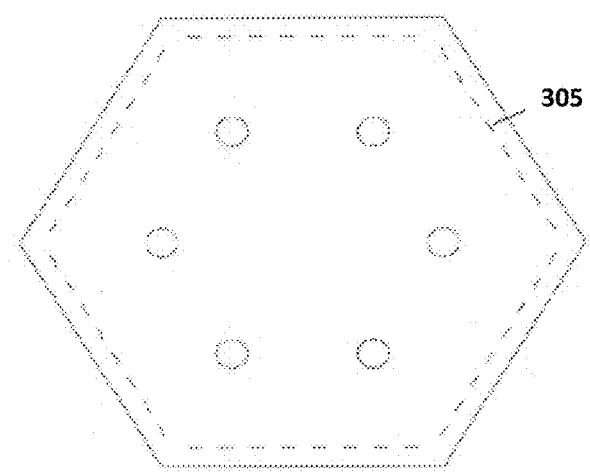
Figure 4G:
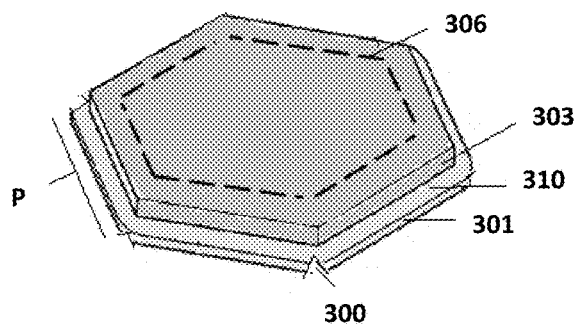

In an exemplary panel P, casing 301 and first lining layer 303 are bonded or laminated together by adhesive 302 (not shown), as depicted in FIG. 4G. As shown, the peripheral area 310 of the casing 301 can include a notch 300 at one or more corners so turning or folding can more easily be performed. The first lining layer 303 can have perforated lines 306, defined at for example from approximately 2.0-4.0 mm from its edges, to increase the softness, adhesion and groove formation at joints-like a hand stitched ball when bladder pressure is applied to it.

Figure 4I:
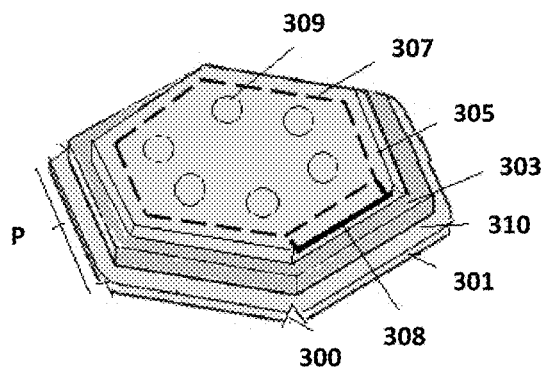
Figure 4H:
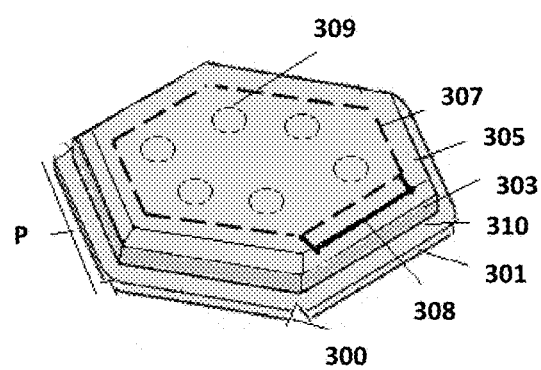

In an exemplary panel P, the additional (second) lining layer 305 can have a similar shape and size to the first lining layer 303 and can further be bonded with the adjacent first lining layer 303 through adhesive 304 (not shown), as depicted in figure FIG. 4H.

The additional (second) lining layer 305 can be similar in shape but have a smaller size, (for example not more than from approximately 0.5-9.5 mm) as compared to the first lining layer 303, and be bonded to the adjacent first lining layer 303 through adhesive 304 (not shown), as depicted in FIG. 4I.

In an exemplary panel P, the additional (second) lining layer 305 can have perforated lines 308, defined at for example from approximately 2.0-4.0 mm from the edges to increase the softness, adhesion and groove formation at joints when bladder pressure is applied to it. The perforated lines 306 and 308 can be similar in their specification and dimensions regarding their distance from the edges and size of perforation. For example, the horizontal length of each perforation 307 of first lining layer and second lining layers can be within the range of from approximately 1.8-2.5 mm, and the distance in their axial directions between two perforations can be approximately 1.5-2.2 mm.

In an exemplary panel P, the additional (second) lining layer 305 can include circular holes or apertures 309 at for example from approximately 15.0-25.0 mm from one or more corners to increase the adhesion, softness and help to release or vent out trapped air between the two lining layers 303 and 305. The diameter of each circular hole 309 can be approximately 1.5-4.5 mm.

In an exemplary panel P, the peripheral area 310 of the casing 301 can be turned inside (inwardly toward the abutting edges of the first and second lining layers), and bonded to the abutting edges of the first lining layer 303 or/and additional (second) lining layer 305 by adhesive 302 (not shown). The inside turning of the peripheral area 310 of the casing 301 towards the abutting edges of the lining layers can be achieved manually or by applying pressure using a machine.

In an exemplary panel P, the thickness of the casing 301 can be from approximately 0.5-2.0 mm while the first lining layer 303 and additional (second) lining layer 305 can be from approximately 1.5-6.5 mm and 0.5-2.5 mm, respectively; however, the collective thickness of the panels may not be more than approximately 8.5 mm.

In an exemplary panel P, the first lining layer 303 and additional (second) lining layer 305 can optionally be adjacently bonded or joined first, and then bonded with the casing 301 through adhesive 304 and 302, respectively, to form the exemplary panel P.

In an exemplary panel P, the bonding of casing 301, first lining layer 303 and additional (second) lining layer 305 can independently be performed manually or by using machine. The application of adhesives 302 and 304 can also be achieved manually or by using machine.

Figure 5A:
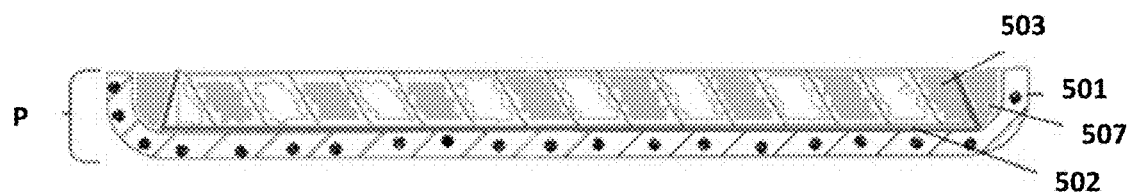
FIG. 5A illustrates an enlarged cross-sectional view of another exemplary panel comprising a casing and first lining layer according to an exemplary embodiment of the present invention.

FIG. 5A illustrate an enlarged cross-sectional view of exemplary panel P, wherein the casing 501 and first lining layer 503 are similar in shape and size, and are bonded together by adhesive 502. Flanges 507 are formed by incision of the first lining layer 503 at from approximately 2-4 mm from the edges, and turned inside to bond with the abutting edges of the first lining layer 503.

FIGS. 5B-5E illustrates a method of manufacturing an exemplary panel P, wherein the first lining layer 503 and the casing 501 are similar in shape and size.

Figure 5B:
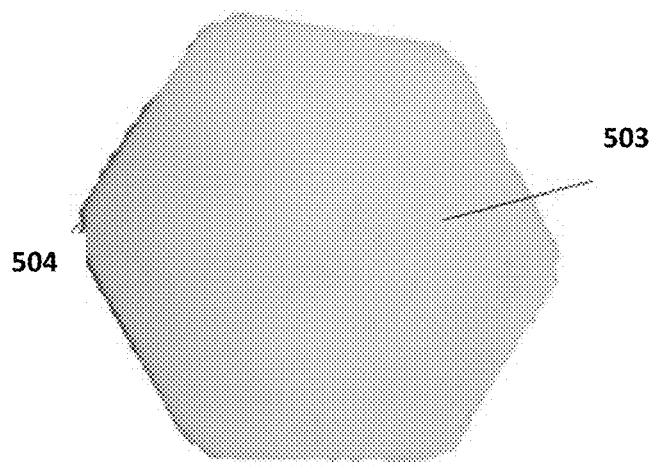
FIGS. 5B-5E illustrate a method of manufacturing another exemplary panel, wherein the casing and first lining layer are equal in size and bonded or laminated together, according to an exemplary embodiment of the present invention.

The exemplary panel P can be obtained by cutting the composite sheet $S_4$ as depicted in FIG. 5B. The casing 501 (not shown), adhesive 502 (not shown) and lining layer 503 can be like the casing 301, adhesive 202 or 302 and first lining layer 303, respectively.

In an exemplary panel P, the bonded casing 501 and first lining layer 503 can have a notch 504 at one or more corners, to facilitate easy inside turning or folding. The structure and purpose of the notch 504 is like notch 300.

Figure 5C:
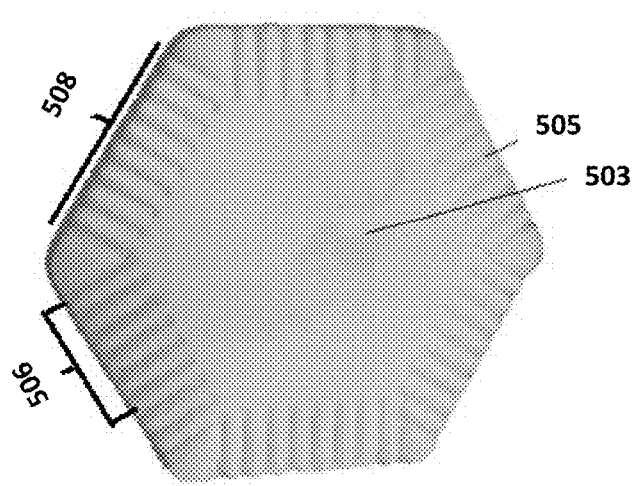

In an exemplary panel P, parallel grooves 506 can be defined at the flange area or peripheral area 505 of the first lining layer 503, and the flange area or peripheral area 505 can be defined up to from approximately 12-22 mm from the respective edges. Each groove can be perpendicular to the abutting edges 508 of the first lining layer 503 as depicted in FIG. 5C. The length of each groove can be from approximately 12-20 mm, while the width can be equal to the distance between two of them, for example, from approximately 1.0-3.0 mm. The parallel grooves 506 serve as air channels or air pockets when the panel is bonded to the bladder 800 enclosed in carcass as depicted in FIG. 9C. The air channels can increase the softness and groove formation at joints when bladder pressure is applied at the center of an exemplary panel P.

Figure 5D:
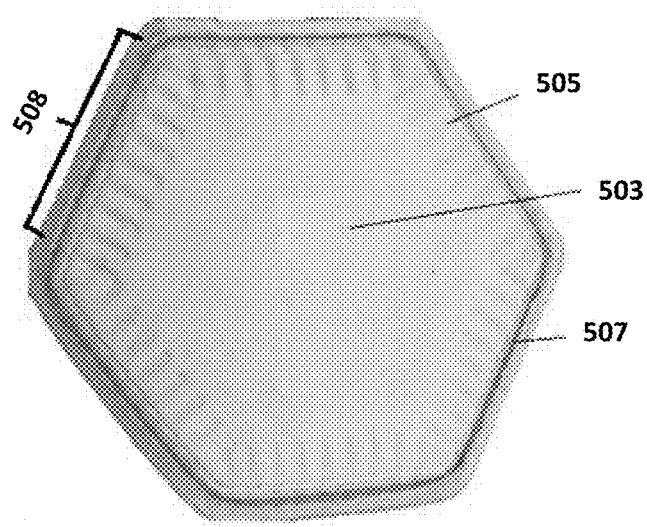
Figure 5E:
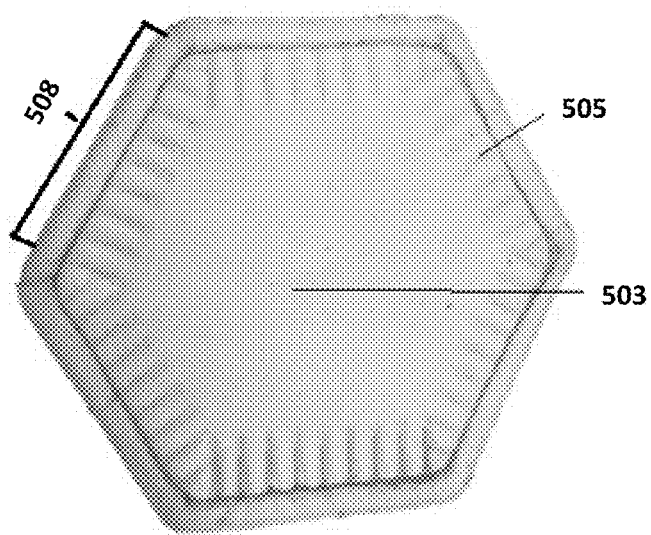

In an exemplary panel P, the flange area of the first lining layer 503 can be cut at from approximately 2-4 mm to the edges by hot blade of an automatic machine to create flanges 507 within the flange area 505, at each side of the panel P as depicted in FIG. 5D. The cut path can intersect the grooves 506, and intersect at preferably a right angle. The flanges 507 turn inside and are bonded to the first lining layer 503 in a manner to make the inner surface and the abutting edges 508 of the first lining layer 503 coplanar as illustrated in FIG. 5E.

In an exemplary panel P, the inside turning of the flanges can be achieved by applying heat and/or pressure using a machine. The thickness of the casing 501 and first lining layer 503 can be from approximately 0.5-2.0 mm and 1.5-6.5 mm, respectively, within the exemplary panel P; however, the collective thickness should not exceed 8.5 mm.

In exemplary panels P, the casing 301 or 501 material can be selected from artificial leather, polyvinyl chloride (PVC), polyurethane (PU) or thermoplastic polyurethane (TPU) or the like, while the first lining layer 303 or 503 and/or additional (second) lining layer 305 can be comprised of foam, and the foam or foaming member can be comprised or formed of one or more materials selected from chloroprene (CR), polyurethane (PU), ethylene vinyl acetate (EVA), polyethylene (PE), polyvinyl chloride (PVC), polystyrene, polyolefin, ethylene propylene diene monomer (EPDM), polyolefin elastomer (POE), thermoplastic elastomer (TPE), natural foam, artificial foam, and/or hybrid foam. The adhesive 202, 302, 304 can independently be selected from water-based natural adhesive, synthetic adhesive, and/or the like.

Figure 6A:
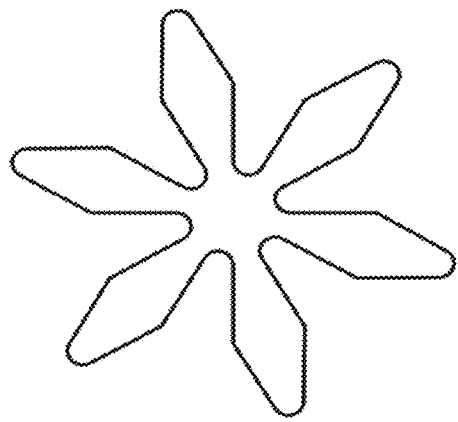
FIGS. 6A-6R illustrate various shapes of exemplary panels of exemplary embodiments of the present invention.
Figure 6B:
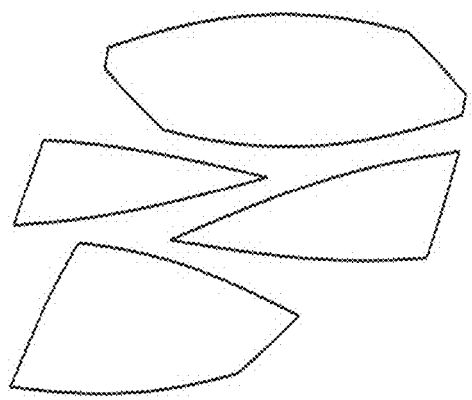
Figure 6C:
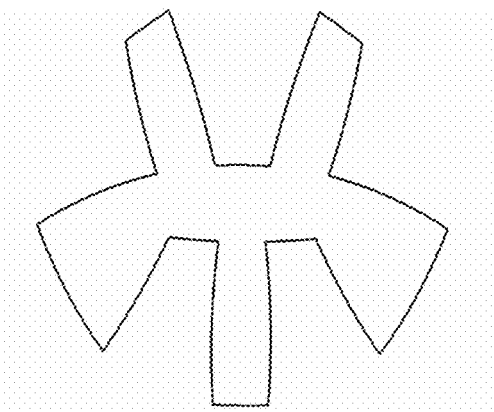
Figure 6D:
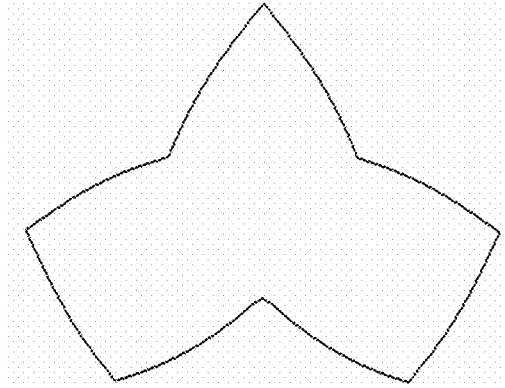
Figure 6E:
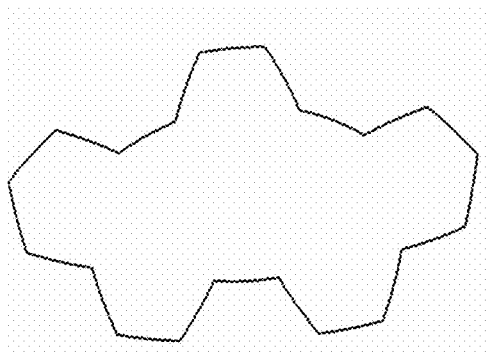
Figure 6F:
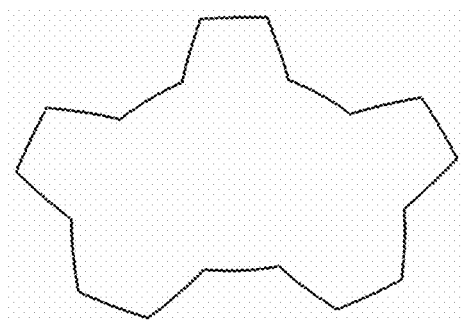
Figure 6G:
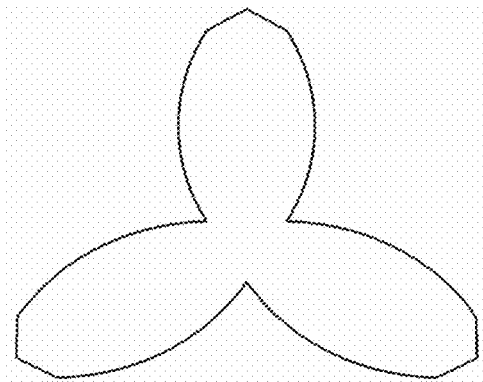
Figure 6H:
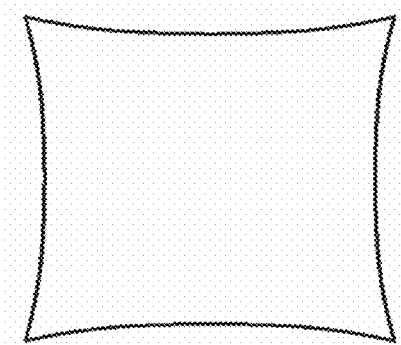
Figure 6I:
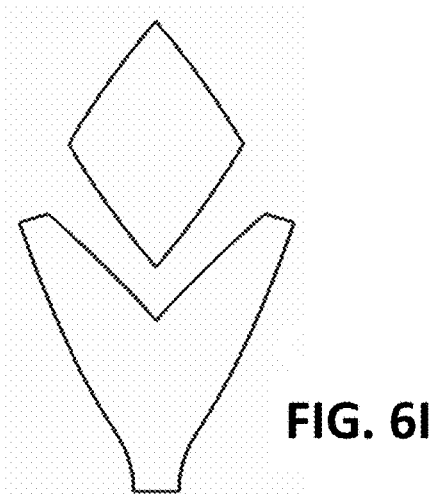
Figure 6J:
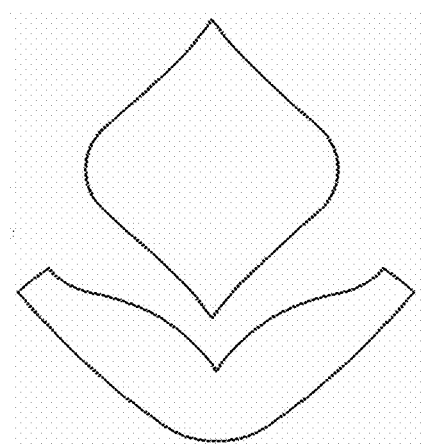
Figure 6K:
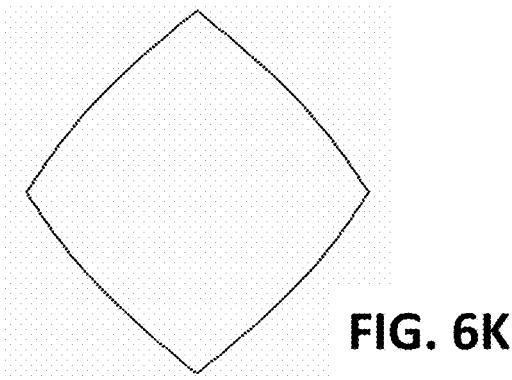
Figure 6L:
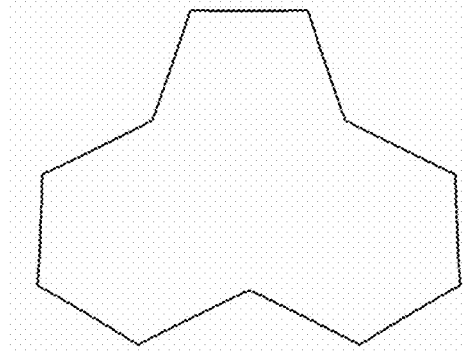
Figure 6M:
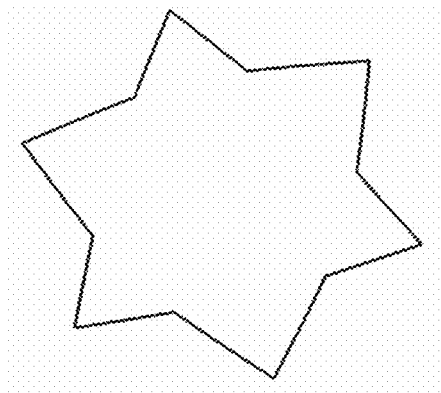
Figure 6N:
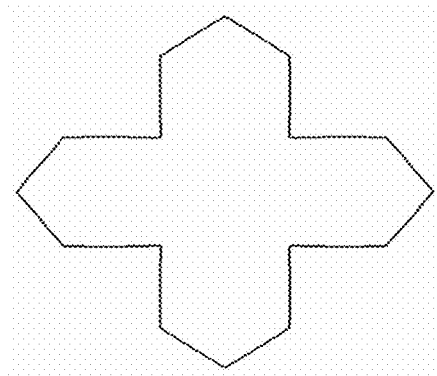
Figure 6O:
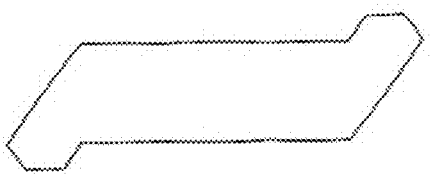
Figure 6P:
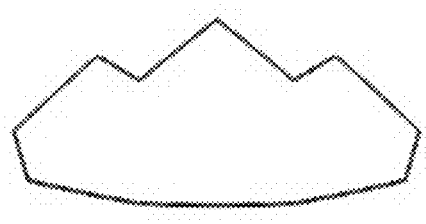
Figure 6Q:
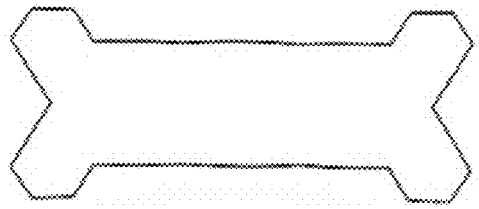
Figure 6R:
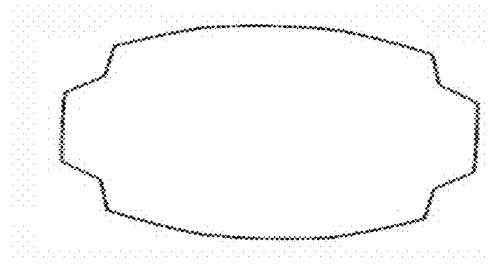

FIGS. 6A-6R illustrates various shapes of the exemplary panel P.

Figure 7:
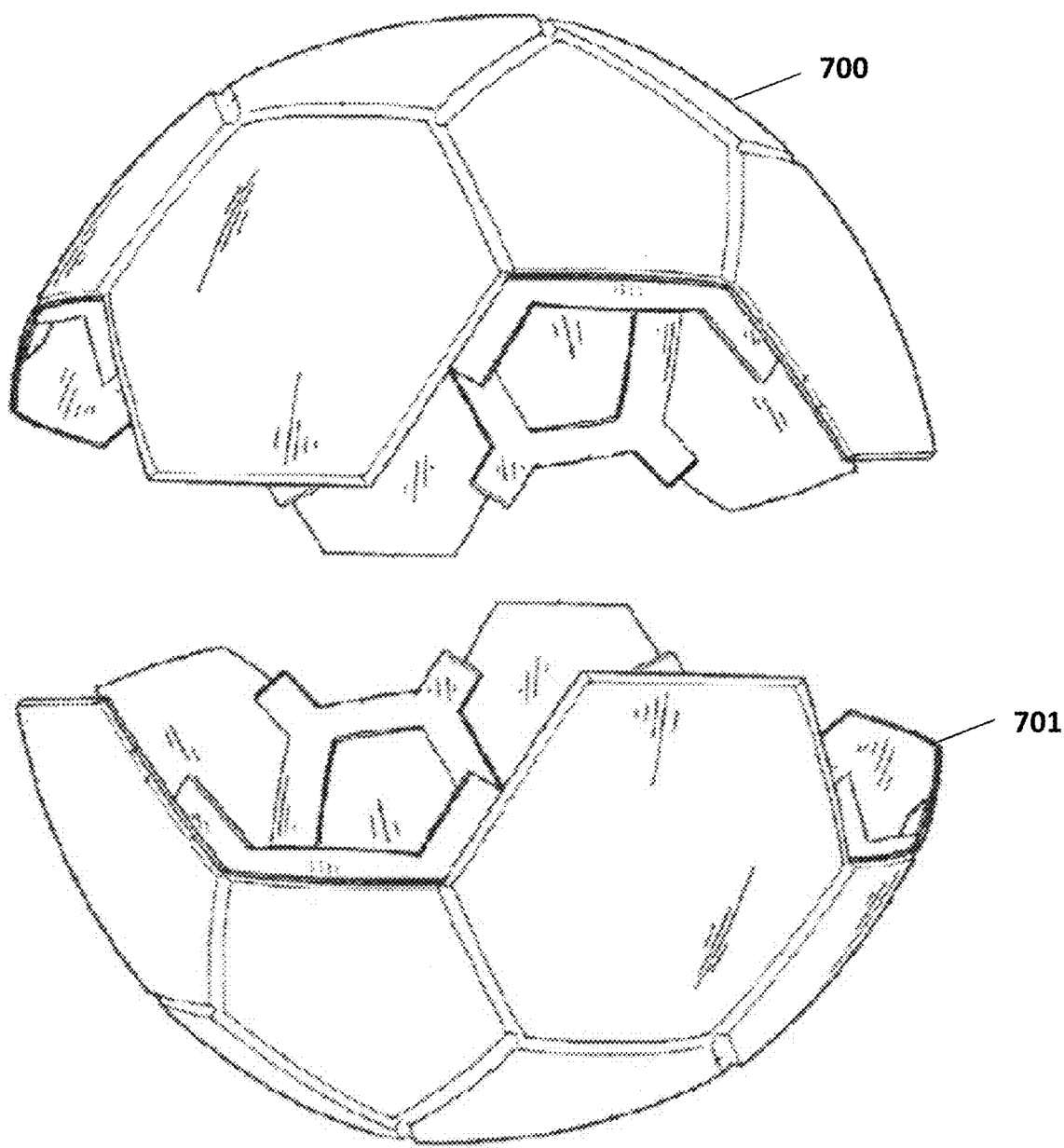
FIG. 7 illustrates an arrangement of exemplary panels joined at the abutting edges through an adhesive to form substantially hemispherical shells of the sports ball according to an exemplary embodiment of the present invention.

FIG. 7 illustrates the arrangement of exemplary panels P bonded or attached through the abutting edges by an adhesive to form substantially hemispherical shells 700 and 701. In an exemplary embodiment of the present invention, each hemispherical shell 700 and 701 can comprise 16 exemplary panels P, wherein one hemispherical shell has a valve panel that is bonded with the valve 801 of the bladder 800.

Figure 8A:
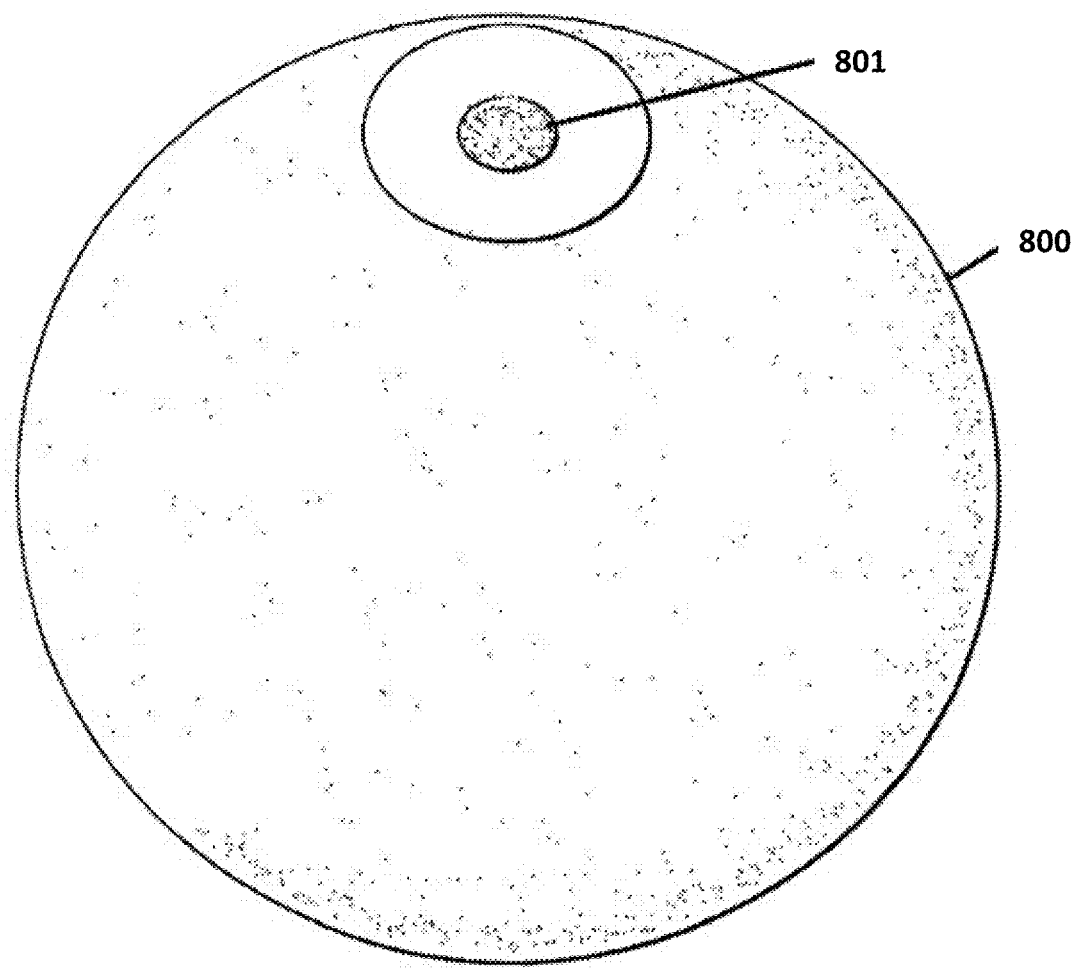
FIG. 8A illustrates an exemplary zero wing bladder having the valve therein according to an exemplary embodiment of the present invention.
Figure 8B:
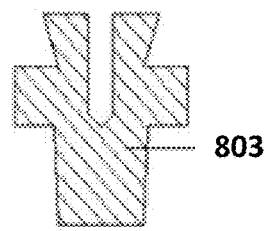
FIGS. 8B-8E illustrates cross-sectional views of the valve that has a double lock mechanism according to an exemplary embodiment of the present invention.
Figure 8C:
Figure 8D:
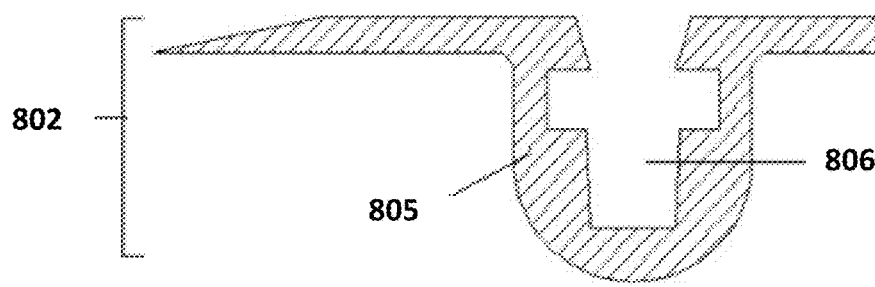

FIG. 8A illustrates an exemplary zero wings bladder 800 having a valve 801 therein. The bladder 800 can be made from a rubber or carbon latex material or by any natural or synthetic monomer or polymer. The bladder can optionally be covered or coated with a thin layer of a chemical or polymer having an elastic property like rubber, and can retain the air for much more time in the inflated bladder to increase the durability of an inflated sports ball by utilizing it.

The coated thin layer of monomer or polymer helps to reduce the permeability of the bladder, maintaining pressurized air within, and not outwardly, helping to reduce escape of air from the interior of the bladder, and decreasing the air loss to from approximately 10-15% within 72 hours, tested as per the protocol set by FIFA. Other hanging bladder embodiments can be selected from four wings bladders, seven wings bladders, or multiple wings bladders, or the like.

Figure 8E:
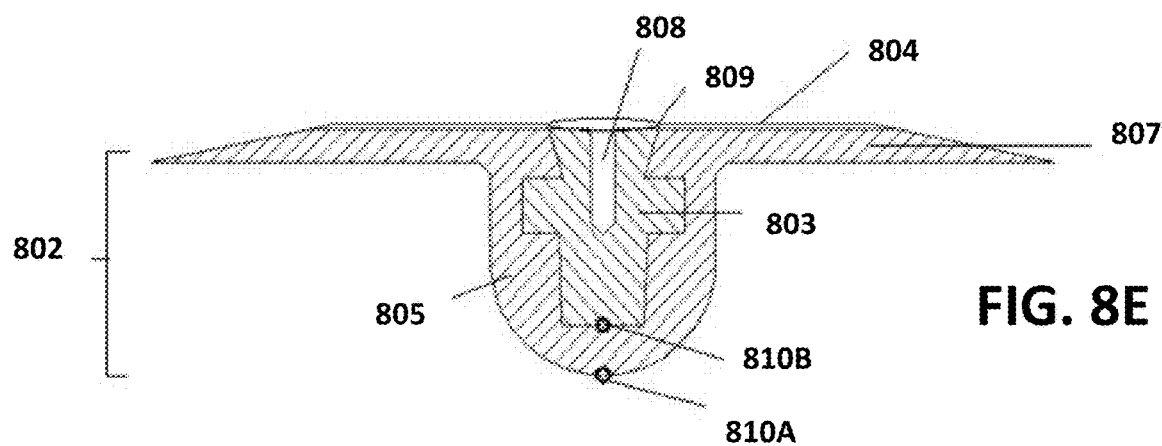

FIGS. 8B-8E illustrate enlarged cross-sectional views of the valve 801 that has the double lock mechanism or system therein. The valve 801 can be comprised of valve housing 802, valve heart 803, and a fabric patch 804. The valve housing 802 can comprise a U-shaped structure 805 that has a cavity 806, wherein the valve heart 803 can be inserted and fixed, and an umbrella-like circular collar 807 as depicted in FIG. 8E. The valve heart 803 can have a tube-like aperture 808 that can guide the nozzle of the device or tool used to insert the pressurized air within the bladder 800. The depth of the aperture 808 preferably does not exceed approximately 12 mm.

In an exemplary embodiment, the valve heart 803 can be inserted into the valve housing 802 manually or by using a machine. A fabric patch 804 can be circular in shape, having a hole or aperture 809, and can be laminated or bonded to the collar 807 of the valve housing 802 in a manner that tube-like aperture 808 and hole 809 hole are coincidental or coaxial. The fabric patch 804 can increase the bonding of the valve in the bladder 800 to the valve panel. The valve panel can for example be pentagonal or hexagonal in shape. A preferable shape for the valve panel is pentagonal. The remaining area of the collar 807 where fabric patch 804 is not bonded can be tapered to avoid protrusion in the valve panel during play or strike test and for coinciding with the shell of bladder 800.

In an exemplary embodiment, the nozzle can be passed through an aperture 808 and extend inwardly by generating two new holes/apertures 810A and 810B at the bottom of valve heart 803 and U-shaped structure 805 respectively, to insert pressurized air in the bladder 800. After removing the nozzle, the holes 810B and 810A can serve as first and second locks for the pressurized air, and not allow the air to come out from the bladder 800 through valve 801.

Figure 9A:
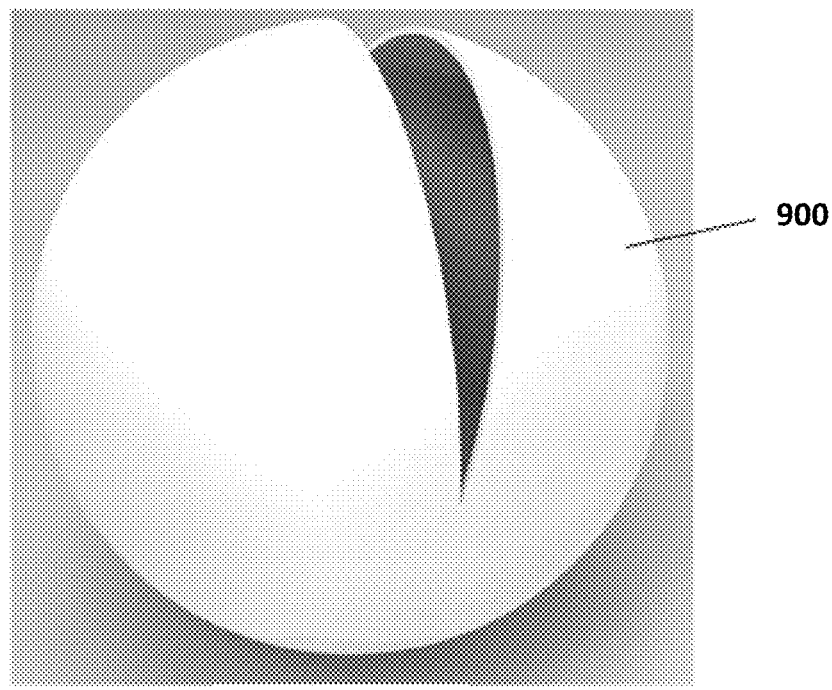
FIG. 9A illustrates an exemplary fabric carcass with and without enclosing a bladder according to an exemplary embodiment of the present invention.
Figure 9B:
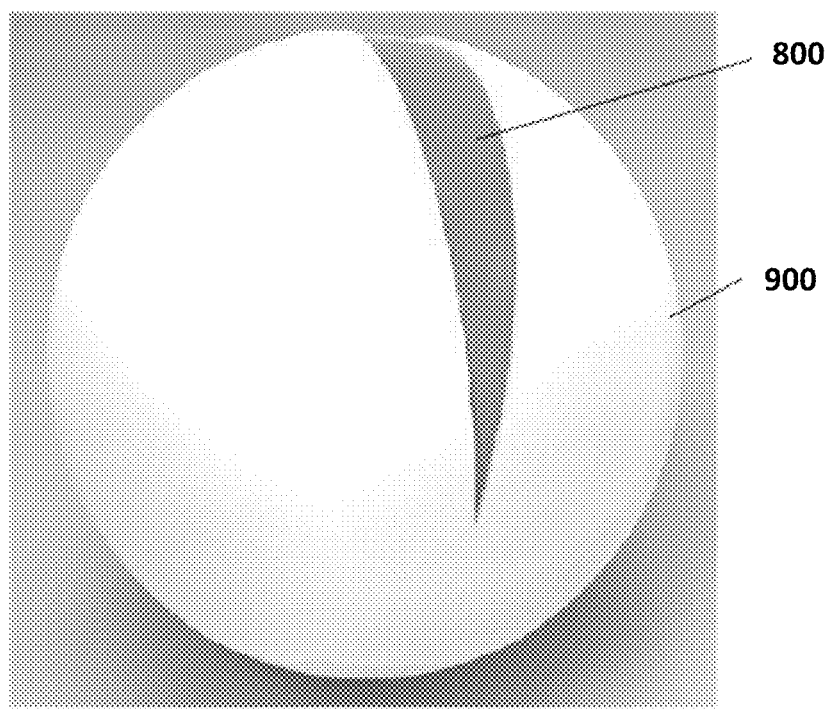
FIG. 9B illustrates an exemplary fabric carcass with an exposed bladder before to close it according to an exemplary embodiment of the present invention.
Figure 9C:
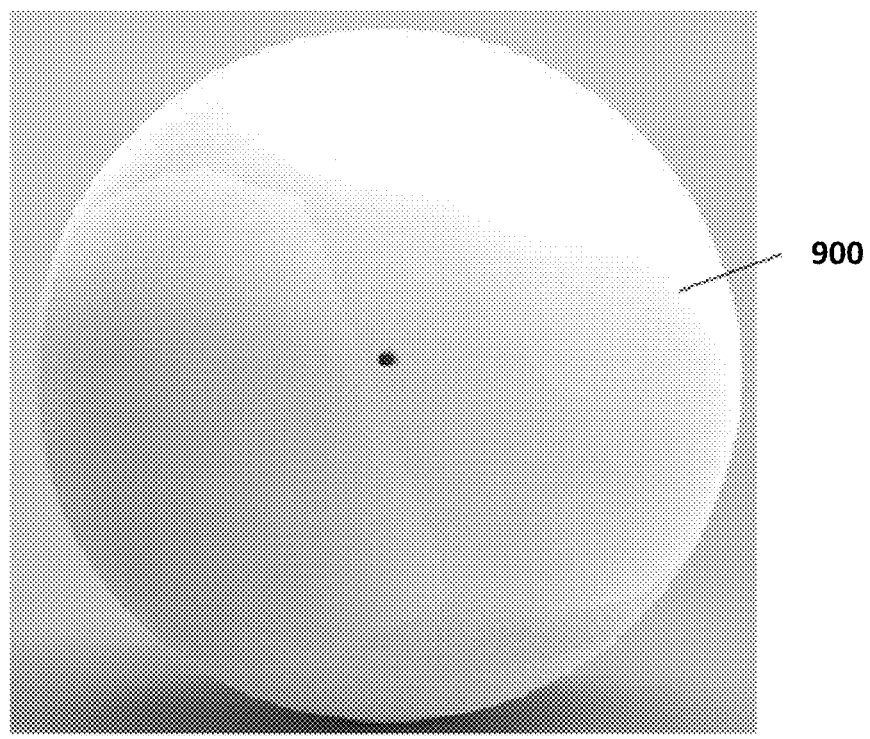
FIG. 9C illustrates an exemplary fabric carcass wrapped hanging bladder according to an exemplary embodiment of the present invention.

FIG. 9A illustrates an exemplary empty fabric carcass 900, and FIG. 9B a fabric carcass 900 surrounding the bladder 800 prior to closure and after closing.

Figures 9D, 9E:
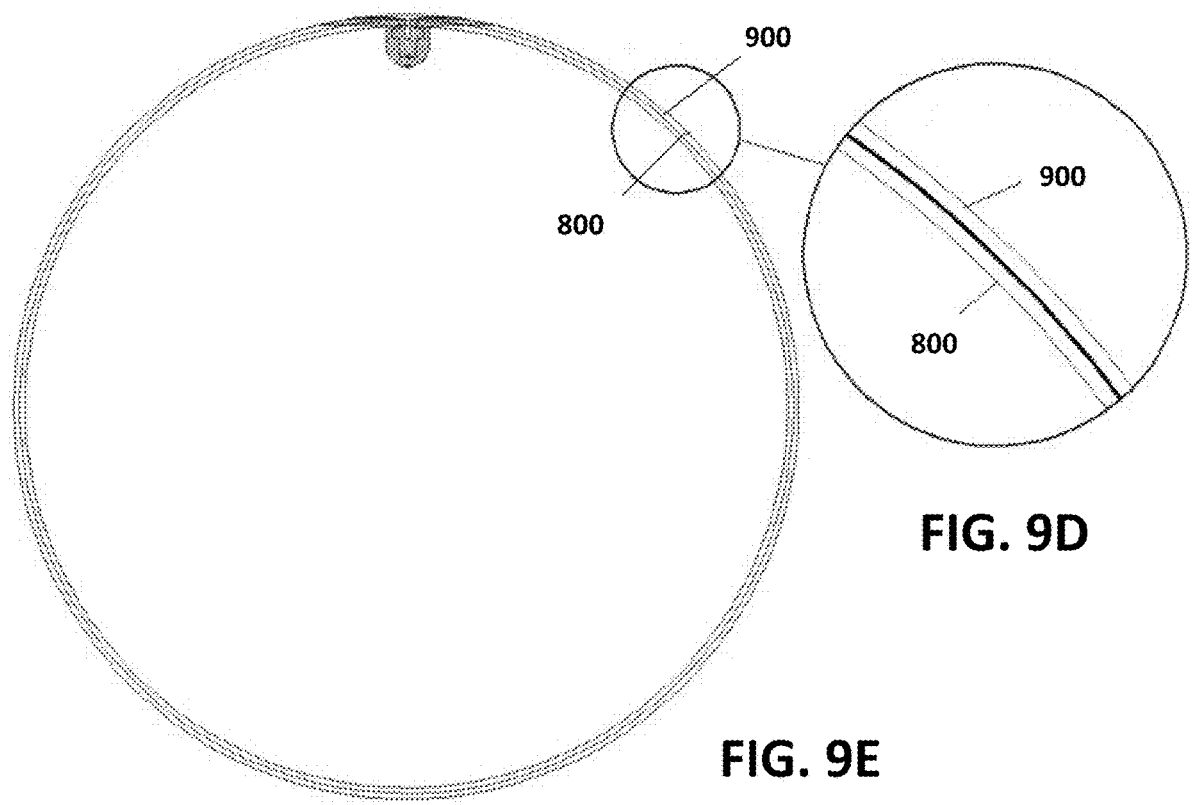
FIGS. 9D-9E illustrate a cross-sectional view of an exemplary fabric carcass wrapped inflated hanging bladder according to an exemplary embodiment of the present invention.

FIG. 9C illustrates an exemplary bladder 800 (not shown because it is) surrounded by the carcass 900 and its cross-sectional views (FIGS. 9D-9E). The carcass 900 can be manufactured/prepared by bonding or laminating the number of fabric pieces in an overlapping manner manually or by machine.

In an exemplary embodiment, the outer surface of the bladder 800 and inner surface of the carcass 900 can be coated with an anti-adhesive chemical to prevent bonding thereof. The carcass 900 can, in an exemplary embodiment, only be bonded to the bladder through the valve 801 of the bladder 800. The bladder 800 surrounded by the fabric carcass 900 can optionally be passed through a machine to remove wrinkles, if found on the surface of the carcass 900.

The innermost surfaces of the exemplary panels P of each hemispherical shell can be laminated by an adhesive and placed in upper and lower portions of a ball-forming molding machine, wherein one portion can have the valve panel. The bladder depicted in FIG. 9C can be placed in accordance with the valve panel to form the exemplary sports ball of the present invention by applying other features or steps of the thermo-bonding technique as conventionally followed.

In an exemplary embodiment of the present invention, the seam of the sports ball can further be protected by an adhesive to reduce the water uptake in such conditions set by the FIFA. In an exemplary embodiment, all bonding or attachments can be achieved by an adhesive. The adhesive can independently be selected from the group consisting of water-based natural adhesive, synthetic adhesive, or the like.

Similarly, for size 4 or size 3 balls, a variety of numbers and configurations of exemplary embodiments may vary according to their requirements, all of which are within the scope of the present invention.

In an exemplary embodiment, the inflated sports ball can be optionally passed through a molding process to attain the round shape of the ball. Resultantly, the sports ball manufactured by this process is extra soft with excellent performance as to feel, stability, durability, playability, flight and other aerodynamic characteristics of the professional ball, and further meets the international standards for a match ball.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A sports ball comprising:
   a valve having a double-lock mechanism;
   a hanging or suspended inflatable bladder attached to the valve;
   a fabric carcass surrounding the hanging or suspended inflatable bladder and attached to the valve, wherein the inflatable bladder is not fixedly attached to the carcass; and
   a plurality of panels communicative with one another along edges of the panels;
   wherein each panel comprises at least two layers, a casing layer having an outer surface and an inner surface, and a first lining layer having an outer surface and an inner surface;
   wherein the outer surface of the casing layer forms an exterior surface of the sports ball;
   wherein the double-lock mechanism of the valve provides two distinct locations of sealing between the inflatable bladder and the exterior surface of the sports ball;
   wherein the inner surface of the casing layer is communicative with the outer surface of the first lining layer;
   wherein the inner surface of the first lining layer is communicative with an outer surface of the carcass; and
   wherein an outer flange area of the first lining layer comprises a plurality of grooves extending inwardly and oriented perpendicular to an unfolded perimeter edge of the first lining layer, the plurality of grooves being positioned about the inner surface of the first lining layer,
   wherein a length of each of the plurality of grooves is between from approximately 12 to approximately 20 mm, and
   wherein, measured inwardly from the unfolded perimeter edge of the first lining layer, a cut is provided, wherein the cut is parallel to the unfolded perimeter edge of the first lining layer and is positioned between from approximately 2 to approximately 4 mm from the unfolded perimeter edge of the first lining layer to form flanges wherein the flanges are turned inwardly and bonded to the first lining layer to create a folded perimeter edge.

2. The sports ball of claim 1, wherein the plurality of panels is communicative with one another along edges of the panels via bonding of the edges;
   wherein the inner surface of the casing layer is communicative with the outer surface of the first lining layer via an adhesive; and
   wherein the inner surface of the first lining layer is communicative with the outer surface of the carcass via an adhesive.

3. The sports ball of claim 1, wherein a width of the outer flange area of the first lining layer measured inwardly from the unfolded perimeter edge of the first lining layer is less than approximately 25 mm.

4. The sports ball of claim 1,
   wherein a width of each of the plurality of grooves is substantially equal to a distance between two adjacent grooves.

5. The sports ball of claim 1,
   wherein a width of each of the plurality of grooves is between from approximately 1 to approximately 3 mm.

6. The sports ball of claim 1, wherein a shape of each panel comprises a plurality of vertexes or corners; and
   wherein the casing layer and the first lining layer has a notch formed at each vertex or corner of the panel.

7. The sports ball of claim 1, wherein a thickness of the casing layer is between from approximately 0.5 to approximately 2 mm; and
   wherein a thickness of the first lining layer is between from approximately 1.5 to approximately 6.5 mm.

8. The sports ball of claim 1, wherein a thickness of each panel is less than approximately 8.5 mm.

9. The sports ball of claim 1 further comprising one or both of:
   a barrier coating of an anti-adhesive chemical applied to one or both of an outer surface of the inflatable bladder and an inner surface of the carcass so the inflatable bladder is not fixedly attached to the carcass; and
   a low permeate layer applied to an outer surface of the inflatable bladder.

10. The sports ball of claim 1, wherein the fabric carcass comprises a plurality of fabric panels, each fabric panel in the plurality of fabric panels overlapping and laminated to at least one other fabric panel in the plurality of fabric panels.

11. A sports ball comprising:
    a valve having a double-lock mechanism
    a hanging or suspended inflatable bladder attached to the valve;
    a fabric carcass surrounding the hanging or suspended inflatable bladder and attached to the valve, wherein the inflatable bladder is not fixedly attached to the carcass; and
    a plurality of panels communicative with one another along edges of the panels;
    wherein each panel comprises a casing layer having an outer surface and an inner surface, a first lining layer having an outer surface and an inner surface, and a second lining layer having an outer surface and an inner surface;

wherein the outer surface of the casing layer forms an exterior surface of the sports ball;

wherein the double-lock mechanism of the valve comprises an aperture at a bottom of a valve heart of the valve and an aperture at a bottom of a U-shaped structure of the valve;

wherein the inner surface of the casing layer is communicative with the outer surface of the first lining layer;

wherein the inner surface of the first lining layer is communicative with an outer surface of the second lining layer;

wherein the inner surface of the second lining layer is communicative with an outer surface of the carcass;

wherein the first lining layer comprises a plurality of perforations forming a perforated perimeter line at a position between from approximately 2 to approximately 4 mm inside from and parallel to a perimeter edge of the first lining layer;

wherein the second lining layer comprises:
  a plurality of perforations forming a perforated perimeter line at a position between from approximately 2 to approximately 4 mm inside from and parallel to a perimeter edge of the second lining layer; and
  a plurality of apertures disposed through the second lining layer; and
  wherein any one of the plurality of apertures is positioned between from approximately 15 to approximately 25 mm from a respective vertex or corner of the second lining layer;

wherein each panel comprises the casing layer of greater surface area than the first lining layer, and the first lining layer of greater surface area than the second lining layer;

wherein the first lining layer is co-located with the casing layer such that a center of each is aligned with one another, and a width of a first peripheral area of the casing layer is defined by a generally uniform difference between an unfolded perimeter edge of the casing layer and the perimeter edge of the first lining layer; and wherein the second lining layer is co-located with the first lining layer such that a center of each is aligned with one another, and a width of a second peripheral area of the first lining layer is defined by a generally uniform difference between the perimeter edge of the first lining layer and the perimeter edge of the second lining layer wherein the first peripheral area of the casing layer is folded inwardly and bonded to the first lining layer and/or the second lining layer.

12. The sports ball of claim 11, wherein the plurality of panels is bonded to one another along edges of the panels;
  wherein adhesive bonds at least a portion of the inner surface of the casing layer with at least a portion of the outer surface of the first lining layer;
  wherein adhesive bonds at least a portion of the inner surface of the first lining layer with at least a portion of the outer surface of the second lining layer; and
  wherein adhesive bonds at least a portion of the inner surface of the second lining layer with at least a portion of the outer surface of the carcass.

13. The sports ball of claim 11, wherein the width of the first peripheral area is less than approximately 6.5 mm; and
  wherein the width of the second peripheral area is between from approximately 0.3 to approximately 9.5 mm.

14. The sports ball of claim 11 further comprising an air cavity between the casing layer and an adjacent edge of the second lining layer due to differences in sizes of the first lining layer and second lining layer.

15. The sports ball of claim 11, wherein a thickness of the casing layer is between from approximately 0.5 to approximately 2 mm, a thickness of the first lining layer is between from approximately 1.5 to approximately 6.5 mm, a thickness of the second lining layer is between from approximately 0.5 to approximately 2.5 mm.

16. The sports ball of claim 11, wherein a thickness of each panel is less than approximately 8.5 mm.

17. The sports ball of claim 11 further comprising one or both of:
  a barrier coating of an anti-adhesive chemical applied to one or both of an outer surface of the inflatable bladder and an inner surface of the carcass so the inflatable bladder is not fixedly attached to the carcass; and
  a low permeate layer applied to an outer surface of the inflatable bladder.

18. The sports ball of claim 11, wherein the fabric carcass comprises a plurality of fabric panels, each fabric panel in the plurality of fabric panels overlapping and laminated to at least one other fabric panel in the plurality of fabric panels.

19. A method of manufacturing a sports ball comprising:
  forming a plurality of panels, wherein each panel is formed by:
    attaching a casing layer to a first lining layer, the first lining layer comprising:
      a plurality of perforations forming a perforated perimeter line at a position between from approximately 2 to approximately 4 mm inside from and parallel to a perimeter edge of the first lining layer;
    attaching the first lining layer to a second lining layer, the second lining layer comprising:
      a plurality of perforations forming a perforated perimeter line at a position between from approximately 2 to approximately 4 mm inside from and parallel to a perimeter edge of the second lining layer; and
      a plurality of apertures disposed through the second lining layer;
      wherein any one of the plurality of apertures is positioned between from approximately 15 to approximately 25 mm from a respective vertex or corner of the second lining layer;
    applying adhesive to peripheral edges of the casing layer;
    turning the peripheral edges of the casing layer inwardly toward the unfolded perimeter edges of the first and second lining layer; and
    attaching the peripheral edges of the casing to the perimeter edge of the first lining layer;
  attaching the panels to one another along edges of the panels so an outer surface of the casing layers forms an outer shell of the sports ball;
  providing a fabric carcass that surrounds a hanging or suspended inflatable bladder;
  attaching a double-lock valve to the hanging or suspended inflatable bladder and the carcass;
  attaching an outer surface of the carcass to an inner surface of the panels; and
  molding the outer shell of the sports ball;
  wherein each panel comprises the casing layer of greater surface area than the first lining layer, and the first lining layer of greater surface area than the second lining layer;
  wherein the inflatable bladder is not fixedly attached to the carcass; and wherein the double-lock valve provides two distinct locations of sealing between the inflatable bladder and an exterior surface of the sports ball, and comprises an aperture at a bottom of a valve heart of the valve and an aperture at a bottom of a U-shaped structure of the valve, wherein the double-lock valve is configured to accept a nozzle inserted therein for pressurizing the sports ball, and wherein when the nozzle is thereafter removed, the apertures serve as the double locks for the pressurized air, and do not allow the air to come out from the inflatable bladder through the valve.

20. The method of claim 19, wherein each panel is further formed by:
cutting from a first sheet material the casing layer having a shape comprising a plurality of vertexes or corners;
cutting from a second sheet material the first lining layer having the shape and being smaller in size than the casing layer; and
cutting from a third sheet material the second lining layer having the shape and being smaller in size than the first lining layer.

21. The method of claim 20 further comprising forming a notch at each corner or vertex of the casing layer.

22. The method of claim 19, wherein each aperture of the plurality of apertures is a circular hole.

23. The method of claim 22 further comprising one or both of:
coating an outer surface of the bladder with a monomer or polymer coating that resists escape of air from an interior of the bladder; and
coating one or both of an inner surface of the carcass and the outer surface of the bladder with an anti-adhesive chemical so the inflatable bladder is not fixedly attached to the carcass.

24. The method of claim 19, wherein the fabric carcass comprises a plurality of fabric panels, each fabric panel in the plurality of fabric panels overlapping and laminated to at least one other fabric panel in the plurality of fabric panels.

25. A method of manufacturing a sports ball comprising:
forming a plurality of panels, wherein each panel has a shape comprising a plurality of vertexes or corners, and wherein each panel is formed by:
cutting a panel from sheet material comprising a casing layer bonded to a first lining layer;
forming grooves extending inwardly and oriented perpendicular to an unfolded perimeter edge of the first lining layer, the grooves being positioned about an inner surface of the first lining layer, wherein a length of each groove is between from approximately 12 to approximately 20 mm;
forming cut lines along the unfolded perimeter edge of the first lining layer to form flanges around the unfolded perimeter edge of the first lining layer, wherein the cut lines are positioned between from approximately 2 to approximately 4 mm from the unfolded perimeter edge of the first lining layer; and
turning the flanges inwardly to create a folded perimeter edge of the first lining layer;
attaching the panels to one another along edges of the panels so an outer surface of the casing layers forms an outer shell of the sports ball;
providing a fabric carcass that surrounds a hanging or suspended inflatable bladder;
attaching a double-lock valve to the hanging or suspended inflatable bladder and the carcass;
attaching an outer surface of the carcass to the inner surface of the first lining layer of each panel; and
molding the outer shell of the sports ball;
wherein the inflatable bladder is not fixedly attached to the carcass.

26. The method of claim 25, wherein the casing layer is bonded to the first lining layer through an adhesive;
wherein each of the grooves are parallel to one another; and
wherein the cut lines are perpendicular to the grooves.

27. The method of claim 26 further comprising forming a notch at each corner or vertex of the plurality of panels.

28. The method of claim 27 further comprising one or both of:
coating an outer surface of the bladder with a monomer or polymer coating that resists escape of air from an interior of the bladder; and
coating one or both of an inner surface of the carcass and the outer surface of the bladder with an anti-adhesive chemical so the inflatable bladder is not fixedly attached to the carcass.

29. The method of claim 25, wherein the fabric carcass comprises a plurality of fabric panels, each fabric panel in the plurality of fabric panels overlapping and laminated to at least one other fabric panel in the plurality of fabric panels.

* * * * *